United States Patent
Lee et al.

(10) Patent No.: US 12,148,121 B2
(45) Date of Patent: Nov. 19, 2024

(54) IMAGING DEVICE AND IMAGE PROCESSING METHOD

(71) Applicant: SAMSUNG ELECTRONICS CO., LTD., Suwon-si (KR)

(72) Inventors: Hunsoo Lee, Suwon-si (KR); Soyoun Park, Suwon-si (KR); Byungwook Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 103 days.

(21) Appl. No.: 17/901,023

(22) Filed: Sep. 1, 2022

(65) Prior Publication Data

US 2024/0005448 A1    Jan. 4, 2024

(30) Foreign Application Priority Data

Sep. 3, 2021   (KR) .......................... 10-2021-0117947
Jun. 30, 2022  (KR) .......................... 10-2022-0080713

(51) Int. Cl.
G06T 3/4015   (2024.01)

(52) U.S. Cl.
CPC ........ G06T 3/4015 (2013.01); *G06T 2200/32* (2013.01)

(58) Field of Classification Search
CPC .... H04N 25/134; H04N 23/843; H04N 23/84; G06T 3/4015; G06T 3/4046; G06T 2207/20081; G06T 2207/20084; G06T 2200/32; G06T 2207/20221
See application file for complete search history.

(56) References Cited

U.S. PATENT DOCUMENTS

| | | | |
|---|---|---|---|
| 9,292,904 B2 | 3/2016 | Ruggiero | |
| 9,344,690 B2 | 5/2016 | Nowozin et al. | |
| 10,863,148 B2 | 12/2020 | Chuang et al. | |
| 2021/0211615 A1 | 7/2021 | Kim et al. | |
| 2021/0241421 A1 | 8/2021 | Pan et al. | |
| 2021/0243413 A1* | 8/2021 | Park .................. | H04N 23/84 |
| 2021/0392303 A1* | 12/2021 | Park .................. | G06T 3/4015 |

(Continued)

FOREIGN PATENT DOCUMENTS

| | | |
|---|---|---|
| JP | 4371469 B2 | 11/2009 |
| JP | 2021-111236 A | 8/2021 |

OTHER PUBLICATIONS

Gharbi et al., "Deep joint demosaicking and denoising", ACM Transactions on Graphics, vol. 35, Issue 6, Article No. 191, Dec. 5, 2016, https://doi.org/10.1145/2980179.2982399, (13 total pages).

*Primary Examiner* — Kelly L Jerabek
(74) *Attorney, Agent, or Firm* — Sughrue Mion, PLLC

(57) ABSTRACT

An image processing device is provided. The imaging device includes: an image sensor configured to generate an original image; and a processor including: a remosaic processing circuit configured to generate a first remosaic image by performing remosaic processing on a first region of the original image by using a first remosaic method, and generate a second remosaic image by performing remosaic processing on a second region of the original image by using the first remosaic method or a second remosaic method; and a merging circuit configured to generate a converted image having a Bayer pattern based on the first remosaic image and the second remosaic image.

20 Claims, 12 Drawing Sheets

(56) References Cited

U.S. PATENT DOCUMENTS

| | | | |
|---|---|---|---|
| 2022/0165052 A1* | 5/2022 | Gan | G06V 10/7747 |
| 2022/0182537 A1* | 6/2022 | Kim | G06T 5/70 |
| 2023/0101569 A1* | 3/2023 | Cha | H04N 25/13 348/606 |
| 2023/0245269 A1* | 8/2023 | Trott | G06T 3/4046 382/162 |

* cited by examiner

IMAGING DEVICE AND IMAGE PROCESSING METHOD

CROSS-REFERENCE TO RELATED APPLICATIONS

This application is based on and claims priority under 35 U.S.C. § 119 to Korean Patent Application Nos. 10-2021-0117947, filed on Sep. 3, 2021, and 10-2022-0080713, filed on Jun. 30, 2022, in the Korean Intellectual Property Office, the disclosures of which are incorporated by reference herein in their entireties.

BACKGROUND

The present disclosure relates to an imaging device, and more particularly, to an imaging device that efficiently generates a converted image having a Bayer pattern.

An image sensor is a device that converts light reflected or emitted by an object into an electrical signal to obtain an image corresponding to the object. Recently, with the development of the computer industry and the communication industry, the demand for image sensors with improved performance has been increasing in various fields like digital cameras, robots, camcorders, personal communication systems (PCS), game devices, security cameras, and medical micro cameras. An image sensor may include a plurality of pixels, and one pixel may include at least one micro lens, at least one photodiode, and at least one color filter.

An image obtained by the image sensor may be converted into an image having a Bayer pattern for high resolution. Here, because a large amount of calculations are needed for conversion to an image having a Bayer pattern, it may take a long time for the conversion. Therefore, it is necessary to develop a method of more efficiently converting an image to an image having a Bayer pattern.

SUMMARY

One or more embodiments provide an imaging device capable of more efficiently converting an image generated through an image sensor into an image having a Bayer pattern.

According to an aspect of an embodiment, an imaging device includes: an image sensor configured to generate an original image; and a processor including: a remosaic processing circuit configured to generate a first remosaic image by performing remosaic processing on a first region of the original image by using a first remosaic method, and generate a second remosaic image by performing remosaic processing on a second region of the original image by using the first remosaic method or a second remosaic method; and a merging circuit configured to generate a converted image having a Bayer pattern based on the first remosaic image and the second remosaic image.

According to an aspect of an embodiment, an image processing method includes: generating an original image through an image sensor; generating, through a processor, a first remosaic image by performing remosaic processing on a first region of the original image by using a first remosaic method; generating, through the processor, a second remosaic image by performing remosaic processing on a second region of the original image by using the first remosaic method or a second remosaic method; and generating a converted image having a Bayer pattern based on the first remosaic image and the second remosaic image.

According to an aspect of an embodiment, an imaging device includes: an image sensor configured to generate an original image; and an image processor configured to perform remosaic processing by using first remosaic method and second remosaic method on the original image to generate a converted image having a Bayer pattern.

BRIEF DESCRIPTION OF THE DRAWINGS

Embodiments will be more clearly understood from the following detailed description taken in conjunction with the accompanying drawings in which.

DETAILED DESCRIPTION

Embodiments will now be described with reference to the accompanying drawings. Embodiments described herein are provided as examples, and thus, the present disclosure is not limited thereto, and may be realized in various other forms. Each embodiment provided in the following description is not excluded from being associated with one or more features of another example or another embodiment also provided herein or not provided herein but consistent with the present disclosure. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
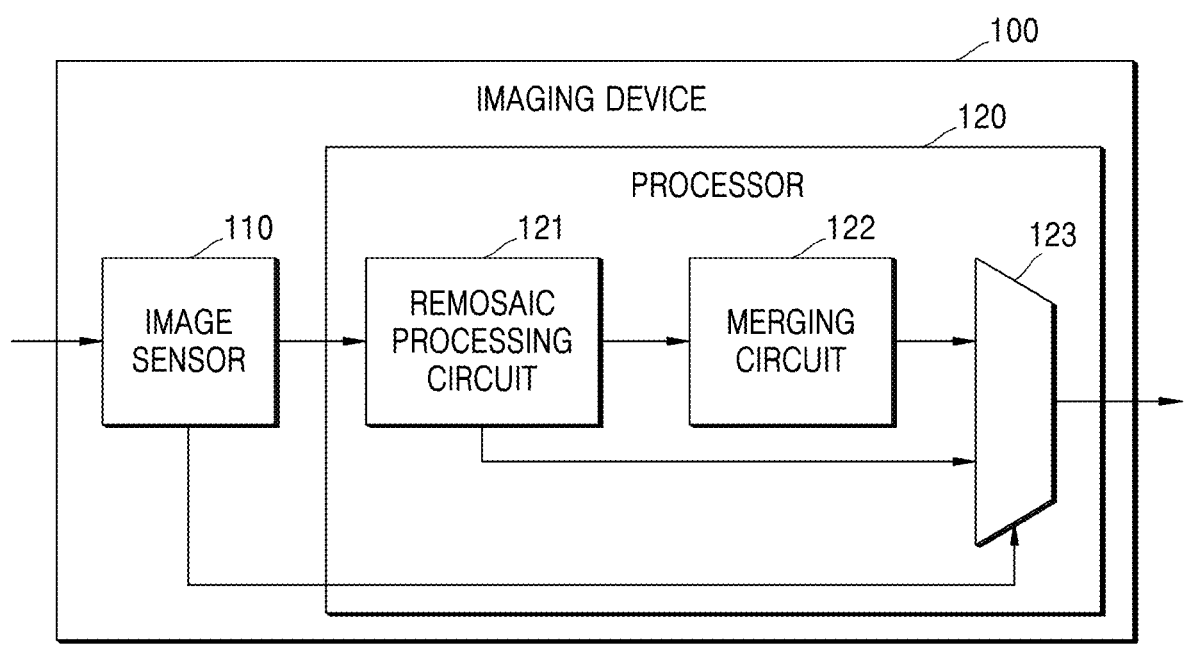
FIG. 1 is a block diagram showing an imaging device according to an embodiment.

FIG. 1 is a block diagram showing an imaging device according to an embodiment.

Referring to FIG. 1, an imaging device 100 according to an embodiment may include an image sensor 110 and a processor 120.

The imaging device 100 may capture and/or store an image of an object by using a solid-state image sensor such as a charge-coupled device (CCD) sensor or a complementary metal-oxide semiconductor (CMOS) sensor.

According to an embodiment, the imaging device 100 may be implemented as a part of a digital camera, a digital camcorder, a mobile phone, a tablet PC, or a portable electronic device. The portable electronic device may include a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book device, a wearable device, etc. Also, the imaging device 100 may be installed on an electronic device such as a drone, an advanced drivers assistance system (ADAS), or an electronic device provided as a component of a vehicle, furniture, a manufacturing facility, a door, and various measuring devices.

According to another embodiment, the imaging device 100 may include the image sensor 110, on which the processor 120 is mounted. In this case, unlike FIG. 1, the processor 120 may be included in the image sensor 110. For example, the image sensor 110 may include a remosaic processing circuit 121, a merging circuit 122, and a selecting circuit 123.

The image sensor 110 may generate an original image. The image sensor 110 may generate an original image corresponding to an object by converting light emitted or reflected from the object into an electrical signal. For example, the image sensor 110 may include one image sensor selected from among image sensors having different properties, e.g., a red, green and blue (RGB) sensor, a black and white (BW) sensor, an infrared sensor, and an ultraviolet sensor, a plurality of image sensors having the same property, or a plurality of image sensors having different properties. Each image sensor included in the image sensor 110 may be implemented by using a CCD sensor or a CMOS sensor.

The processor 120 may perform various image processing on an original image generated by the image sensor 110. The processor 120 may be, but is not limited to, any one of a central processing unit (CPU), a microprocessor, and a micro controller unit (MCU). The processor 120 may include an image processor. In this case, the processor 120 of the imaging device 100 may be a processor which executes software for performing image processing, and the image processor may be implemented as software or a combination of hardware and software.

According to an embodiment, the processor 120 may generate a converted image having a Bayer pattern by performing remosaic processing on an original image.

The Bayer pattern may refer to a pattern in which green, red, and blue are alternately arranged at ratios of 50%, 25%, and 25% according to human visual characteristics.

The remosaic processing may refer to image processing for converting an original image into an image having a Bayer pattern.

The processor 120 may include the remosaic processing circuit 121 and the merging circuit 122. Also, the processor 120 may further include the selecting circuit 123.

The remosaic processing circuit 121 may generate a converted image by performing remosaic processing on an original image by using a first remosaic method and a second remosaic method.

In detail, the remosaic processing circuit 121 may generate a first remosaic image by performing remosaic processing on an original image by using the first remosaic method.

According to an embodiment, the first remosaic method may be a method of performing remosaic processing by using a machine learning model.

According to an embodiment, the machine learning model may be a neural network model. In this case, the remosaic processing circuit 121 may generate a first remosaic image by performing remosaic processing on the original image by using a neural network model.

Although remosaic processing using the first remosaic method is advantageous for generating a high-resolution image, the remosaic processing may take a relatively long time.

In this case, the remosaic processing circuit 121 may generate a first remosaic image by performing remosaic processing on a first region of the original image by using the first remosaic method.

According to an embodiment, the first region may be a pre-set central region of the original image. Detailed descriptions thereof are given below with reference to FIG. 4.

According to another embodiment, the first region may be set based on a seam detected in the original image. Detailed descriptions thereof are given below with reference to FIG. 5.

In this case, the first remosaic image generated by performing remosaic processing on the first region of the original image may have a size corresponding to the size of the first region of the original image.

As described above, the remosaic processing circuit 121 may perform remosaic processing on the first region of an original image by using the first remosaic method. Because the first region is smaller than the original image, the remosaic processing may be performed within a shorter time.

The remosaic processing circuit 121 may generate a second remosaic image by performing remosaic processing on an original image by using the second remosaic method.

According to an embodiment, the second remosaic method may be a method of performing remosaic processing based on a pre-set reference equation. The reference equation may be an equation for obtaining a pixel value of each pixel included in an image on which remosaic processing is to be performed. For example, the reference equation may be an equation for calculating pixel values of an image on which remosaic processing is performed by applying weights respectively to pixel values of adjacent pixels in an original image.

Because remosaic processing using the second remosaic method is performed through a calculation based on a pre-set reference equation, the remosaic processing may be processed within a relatively short time. However, because remosaic processing is performed based on the same reference equation regardless of the type of an original image, an image with a relatively low resolution may be generated.

In this case, the remosaic processing circuit 121 may generate a second remosaic image by performing remosaic processing on a second region of the original image by using the second remosaic method.

The second region may include a region not included in the first region of the original image. According to an embodiment, the second region may correspond to the entire region of the original image. For example, the remosaic processing circuit 121 may generate a second remosaic image by performing remosaic processing on the entire region of the original image by using the second remosaic method. In this case, the second remosaic image may be an image obtained as the original image is remosaic-processed through the second remosaic method. Therefore, the second remosaic image generated by performing remosaic processing on the entire region of the original image may have a size corresponding to the size of the original image.

Because remosaic processing using the second remosaic method may be performed with relatively few calculations, it may be completed within a short time even when the remosaic processing is performed for the entire region.

As described above, the imaging device 100 according to an embodiment may perform remosaic processing on a first region of an original image by using a first remosaic method and perform remosaic processing on a second region of the original image by using a second remosaic method, thereby performing remosaic processing in a shorter time while maintaining a high resolution for a main region of the original image.

The merging circuit 122 may generate a converted image, based on a first remosaic image and a second remosaic image.

The merging circuit 122 may generate a converted image by merging a first remosaic image with a second remosaic image. According to an embodiment, the merging circuit 122 may generate a converted image by merging a first remosaic image into a corresponding region of a second remosaic image. For example, the merging circuit 122 may generate a converted image by merging a first region remosaic-processed by using the first remosaic method with regions of a second region remosaic-processed by using the second remosaic method that are not included in the first region.

After the merging of the first remosaic image with the second remosaic image is completed, the merging circuit 122 may generate a converted image by performing correction on boundary regions of the first remosaic image and the second remosaic image. For example, the merging circuit 122 may correct color, tone, light exposure, etc., around the boundary between the first remosaic image and the second remosaic image in the converted image to improve image quality and make the converted image more natural.

The selecting circuit 123 may select and output one of a second remosaic image and a converted image based on a selection signal received from the image sensor 110. According to an embodiment, the selecting circuit 123 may include a multiplexer (MUX).

The selecting circuit 123 may receive a second remosaic image from the remosaic processing circuit 121. The selecting circuit 123 may receive a converted image from the merging circuit 122. The selecting circuit 123 may receive a selection signal from the image sensor 110. The selecting circuit 123 may select and output one of the second remosaic image and the converted image based on the selection signal. In this case, the selecting circuit 123 may output a selected image to another component in an electronic device on which the imaging device 100 is mounted or to another device outside the electronic device.

According to an embodiment, a selection signal may be set based on the illuminance of an original image. The image sensor 110 may determine the illuminance of an original image and set a selection signal based on the determined illuminance. Next, the selection signal set by the image sensor 110 may be transmitted to the selecting circuit 123. Therefore, the selecting circuit 123 may select and output one of the second remosaic image and the converted image based on the illuminance of the original image. A method of selecting an image to output when a selection signal is set based on the illuminance of an original image is described below in detail with reference to FIG. 8.

According to another embodiment, a selection signal may be set based on a zoom ratio of an original image. The image sensor 110 may determine a zoom ratio of an original image and set a selection signal, based on the determined zoom ratio. Next, the selection signal set by the image sensor 110 may be transmitted to the selecting circuit 123. Therefore, the selecting circuit 123 may select and output one of the second remosaic image and the converted image based on the zoom ratio of the original image. A method of selecting an image to output when a selection signal is set based on the zoom ratio of an original image is described below in detail with reference to FIG. 9.

According to another embodiment, a selection signal may be set based on the resolution of an original image or a time limit, which is a time limit for the entire image processing.

Figure 2:
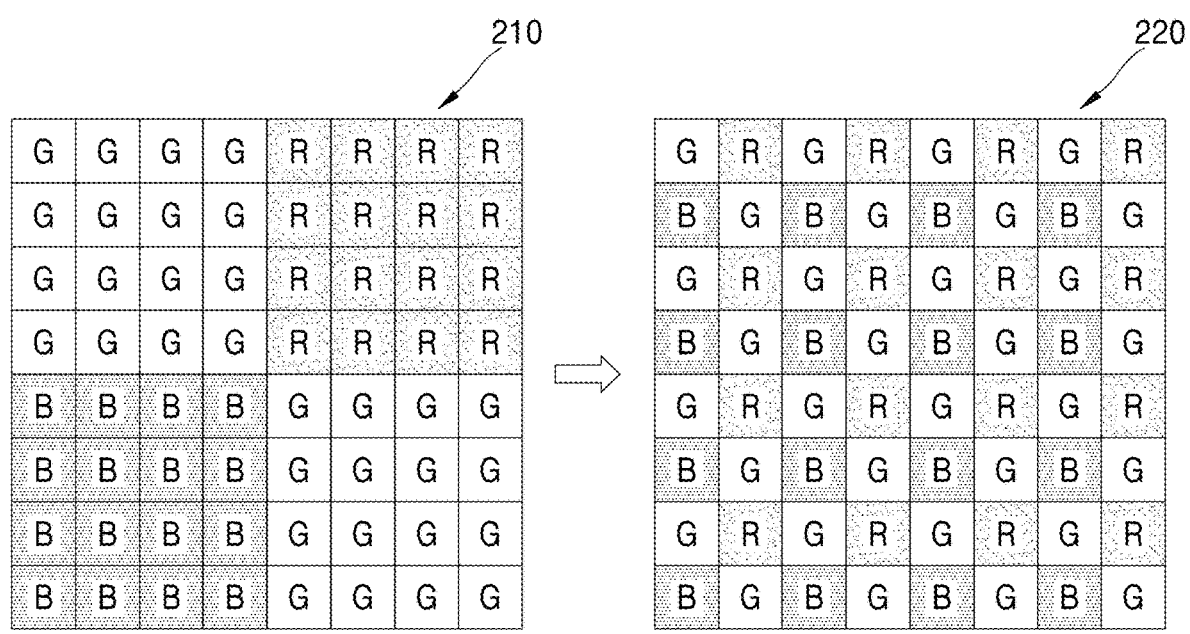
FIG. 2 is a diagram showing an original image and a remosaic image generated by an imaging device according to an embodiment.

FIG. 2 is a diagram showing an original image and a remosaic image generated by an imaging device according to an embodiment.

Referring to FIG. 2, examples of an original image 210 and a remosaic image 220 are shown. As shown in FIG. 2, the original image 210 and the remosaic image 220 may each include 8 rows and 8 columns of pixels, that is, a total of 64 pixels. However, embodiments are not limited thereto, and the original image 210 and the remosaic image 220 may each be an image in which an image having the pattern shown in FIG. 2 is repeated vertically and horizontally. Rows from the uppermost rows to the lowermost rows are sequentially referred to as first to eighth rows, and columns from the leftmost column to the rightmost column are sequentially referred to as first to eighth columns.

First, in the original image 210 shown on the left, pixels included in first to fourth rows and first to fourth columns may have a pixel value corresponding to light that passed through a green color filter G of the image sensor 110. Pixels included in first to fourth rows and fifth to eighth columns in the original image 210 may have a pixel value corresponding to light that passed through a red color filter R of the image sensor 110. Pixels included in fifth to eighth rows and the first to fourth columns in the original image 210 may have a pixel value corresponding to light that passed through a blue color filter B of the image sensor 110. Pixels included in the fifth to eighth rows and the fifth to eighth columns in the original image 210 may have a pixel value corresponding to light that passed through the green color filter G of the image sensor 110.

The remosaic image 220 shown on the right may be an image in which remosaic processing has been performed on the entire region of the original image 210 on the left and may have a Bayer pattern. Pixels included in odd-numbered rows of the remosaic image 220 may alternately have a pixel value corresponding to light that passed through the green color filter G and a pixel value corresponding to light that passed through the red color filter R. Pixels included in even-numbered rows of the remosaic image 220 may alternately have a pixel value corresponding to light that passed through the blue color filter B and a pixel value corresponding to light that passed through the green color filter G.

Figure 3:
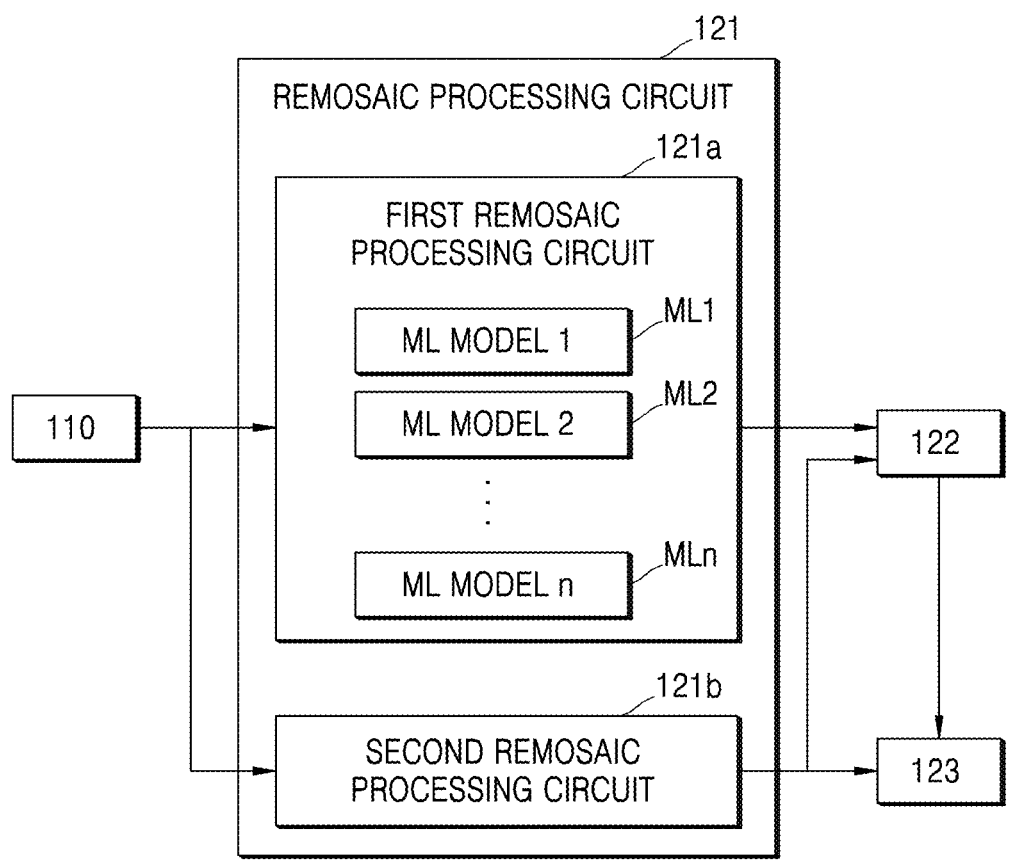
FIG. 3 is a block diagram showing a detailed structure of a remosaic processing circuit of an imaging device according to an embodiment.

FIG. 3 is a block diagram showing a detailed structure of a remosaic processing circuit of an imaging device according to an embodiment.

Referring to FIG. 3, the remosaic processing circuit 121 may include a first remosaic processing circuit 121a and a second remosaic processing circuit 121b.

The first remosaic processing circuit 121a may generate a first remosaic image by performing remosaic processing on a first region of the original image by using a first remosaic method.

The first remosaic processing circuit 121a may include a plurality of machine learning models ML1 to MLn. The machine learning models ML1 to MLn may perform remosaic processing on the original image by respectively performing different amounts of calculations.

For example, the first machine learning model ML1 may perform remosaic processing on an original image by performing the largest amount of calculation from among the machine learning models ML1 to MLn. Also, the n-th machine learning model MLn may perform remosaic processing on an original image by performing the smallest amount of calculations from among the machine learning models ML1 to MLn.

Therefore, the first remosaic processing circuit 121a may generate a first remosaic image with different generation times and different resolutions depending on which machine learning model from among the machine learning models ML1 to MLn is used.

For example, when the first remosaic processing circuit 121a generates a first remosaic image by using the first machine learning model ML1 that performs the largest amount of calculations, a first remosaic image having a high resolution may be generated, and may take a longer time to generate the first remosaic image than the other machine learning models ML2 through MLn. On the other hand, when the first remosaic processing circuit 121a generates a first remosaic image by using the n-th machine learning model MLn that performs the smallest amount of calculations, a first remosaic image may be generated in a short time, but a generated first remosaic image may have a low resolution.

According to an embodiment, the first remosaic processing circuit 121a may identify a machine learning model to perform the largest amount of calculations within a time limit demanded by an electronic device including the imaging device 100, from among the machine learning models ML1 to MLn. Therefore, the first remosaic processing circuit 121a may generate a first remosaic image having a high resolution while satisfying a time limit demanded by an electronic device.

According to an embodiment, the first remosaic processing circuit 121a may perform remosaic processing on an original image by using one or more machine learning models from among the machine learning models ML1 to MLn. At this time, the first remosaic processing circuit 121a may select one or more machine learning models from among the machine learning models ML1 to MLn, based on the quality of a first remosaic image and a generation time of the first remosaic image. The quality of the first remosaic image may include a resolution of the first remosaic image. Next, the first remosaic processing circuit 121a may generate a first remosaic image by performing remosaic processing on a first region of the original image by using a selected machine learning model.

At this time, when a plurality of machine learning models are selected, the first remosaic processing circuit 121a may generate a first remosaic image by performing remosaic processing on a first region of an original image by using a machine learning model that performs the largest amount of calculations from among selected machine learning models.

Also, when a plurality of machine learning models are selected, the first remosaic processing circuit 121a may generate a second remosaic image by performing remosaic processing on a second region of an original image by using a machine learning model that performs the smallest amount of calculations from among selected machine learning models. According to another embodiment, when a plurality of selected machine learning models are selected, the first remosaic processing circuit 121a may generate a second remosaic image by performing remosaic processing on a second region of an original image by using a machine learning model that performs the largest amount of calculations while satisfying a time limit demanded by an electronic device including the imaging device 100, from among selected machine learning models.

The second remosaic processing circuit 121b may generate a second remosaic image by performing remosaic processing on a second region of an original image by using a second remosaic method. When a plurality of machine learning models are selected by the first remosaic processing circuit 121a and a second remosaic image is generated by the first remosaic processing circuit 121a, the second remosaic processing circuit 121b may not generate a second remosaic image.

As described above, the imaging device 100 according to an embodiment may generate a first remosaic image based on the quality of the first remosaic image and the generation time of the first remosaic image, thereby performing remosaic processing more efficiently.

Figure 4:
FIG. 4 is a diagram showing an example of a first region set by an imaging device according to an embodiment.

FIG. 4 is a diagram showing an example of a first region set by an imaging device according to an embodiment.

Referring to FIG. 4, an example of an original image 400 generated by the image sensor 110 may be seen.

The first region 410 may be a pre-set central region of the original image 400. As shown in FIG. 4, the first region 410 may be set as a rectangular region centered at the center of the original image 400. However, embodiments are not limited thereto and, for example, the first region may be set as a circular region having a pre-set radius around the center of the original image 400. Such a central region may be set differently depending on the type of an electronic device on which the imaging device 100 is mounted.

A second region 420 may be the entire region of the original image 400 and may include the first region 410.

The processor 120 may generate a first remosaic image by performing remosaic processing on the first region 410 by using a first remosaic method and generate a second remosaic image by performing remosaic processing on the second region 420 by using a second remosaic method.

Next, the processor 120 may generate a converted image by merging the first remosaic image with the second remosaic image.

Figure 5:
FIG. 5 is a diagram showing another example of a first region set by an imaging device according to an embodiment.

FIG. 5 is a diagram showing another example of a first region set by an imaging device according to an embodiment.

Referring to FIG. 5, an example of an original image 500 generated by the image sensor 110 may be seen.

A first region 510 may be set based on a seam detected in the original image 500. Here, the first region 510 may be set based on a seam detected from the original image 500, for example by the processor 120. For example, the remosaic processing circuit 121 may detect a seam in the original image 500 generated by the image sensor 110 and set the first region 510 based on the detected seam. The remosaic processing circuit 121 may set the interior of a seam near the center of the original image 500 from among detected seams as the first region 510.

A second region 520 may be the entire region of the original image 500 and may include the first region 510.

The processor 120 may generate a first remosaic image by performing remosaic processing on the first region 510 by using a first remosaic method and generate a second remosaic image by performing remosaic processing on the second region 520 by using a second remosaic method. Next, the processor 120 may generate a converted image by merging the first remosaic image with a region of the second remosaic image, the region corresponding to the first region 510.

Figure 6:
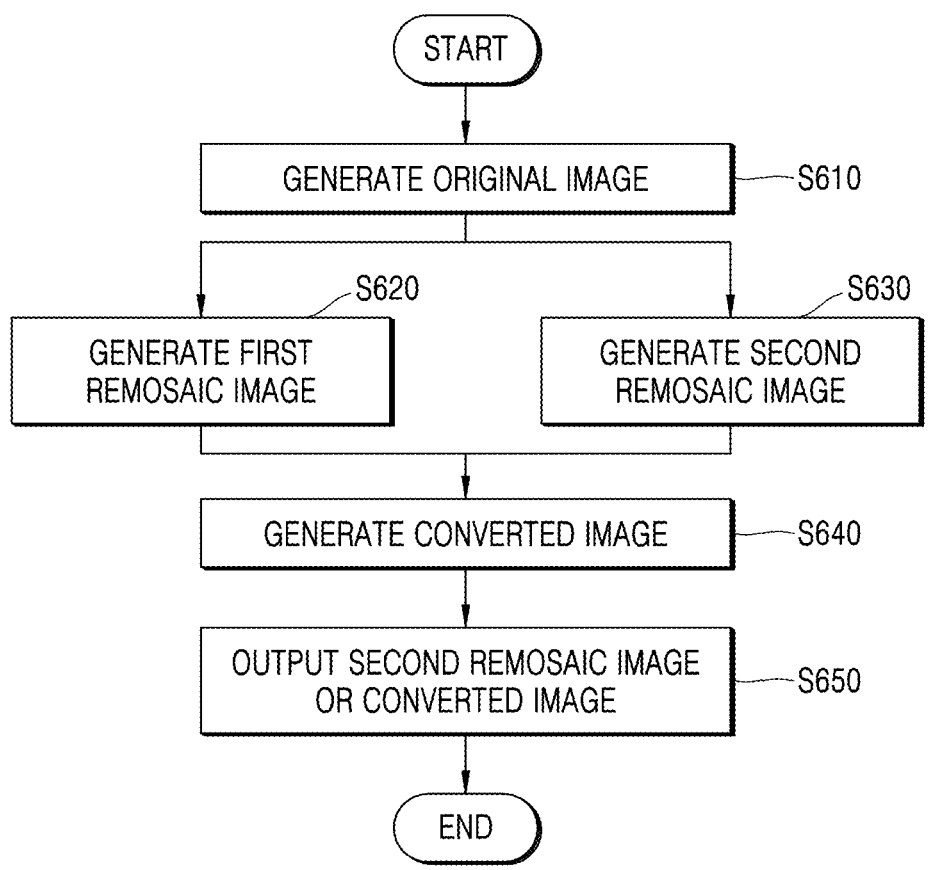
FIG. 6 is a flowchart of an image processing method according to an embodiment.

FIG. 6 is a flowchart of an image processing method according to an embodiment.

Referring to FIG. 6, in operation S610, the imaging device 100 may generate an original image through the image sensor 110. The image sensor 110 may generate an original image and transmit the original image to the remosaic processing circuit 121.

In operation S620, the imaging device 100 may generate a first remosaic image through the remosaic processing circuit 121.

The remosaic processing circuit 121 may generate a first remosaic image by using a first remosaic method. Here, the remosaic processing circuit 121 may perform remosaic processing on a first region of the original image. The remosaic processing circuit 121 may perform remosaic processing by using a plurality of machine learning models. Detailed descriptions thereof are given below with reference to FIG. 7.

In operation S630, the imaging device 100 may generate a second remosaic image through the remosaic processing circuit 121.

The remosaic processing circuit 121 may generate a second remosaic image by using a second remosaic method. Here, the remosaic processing circuit 121 may perform remosaic processing on a second region of the original image. The remosaic processing circuit 121 may perform remosaic processing based on a pre-set reference equation.

At this time, as shown in FIG. 6, operations S620 and S630 may be processed in parallel. For example, the remosaic processing circuit 121 may simultaneously generate a first remosaic image and a second remosaic image by using separate processing circuits therein.

In operation S640, the imaging device 100 may generate a converted image through the merging circuit 122.

The merging circuit 122 may generate a converted image by merging a first remosaic image with a second remosaic image. Here, the merging circuit 122 may generate a converted image by merging a first remosaic image into a corresponding region of a second remosaic image.

In operation S650, the imaging device 100 may output a second remosaic image or a converted image through the selecting circuit 123.

The selecting circuit 123 may select and output one of a second remosaic image and a converted image based on a selection signal received from the image sensor 110. According to an embodiment, a selection signal may be set based on the illuminance of an original image. Detailed descriptions thereof are given below with reference to FIG. 8. Also, according to another embodiment, a selection signal may be set based on a zoom ratio of an original image. Detailed descriptions thereof are given below with reference to FIG. 9.

As described above, according to the image processing method according to an embodiment, a remosaic processing may be performed on a first region of an original image by using a first remosaic method and remosaic processing may be performed on a second region by using a second remosaic method, and thus, remosaic processing may be performed in a shorter time while maintaining a high resolution for a main region of the original image.

Figure 7:
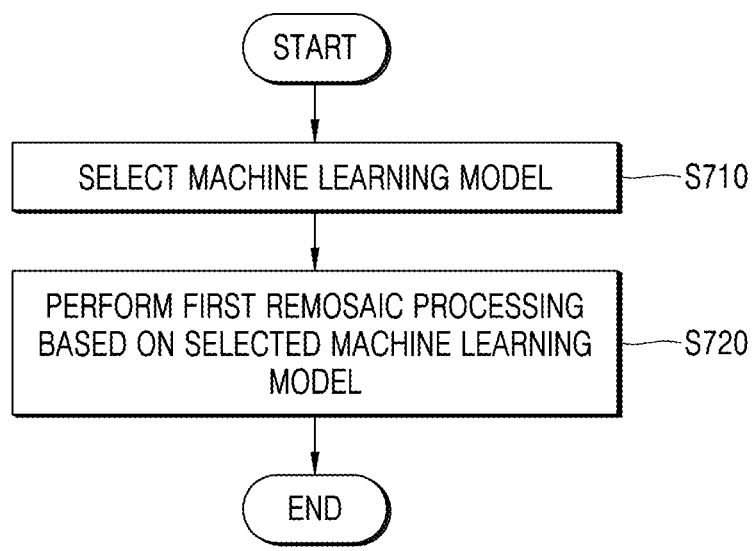
FIG. 7 is a detailed flowchart of a method of generating a first remosaic image in an image processing method, according to an embodiment.

FIG. 7 is a detailed flowchart of a method of generating a first remosaic image in an image processing method, according to an embodiment.

Referring to FIG. 7, in operation S710, the remosaic processing circuit 121 may select a machine learning model.

The remosaic processing circuit 121 may select one or more machine learning models from among a plurality of machine learning models, based on the quality of a first remosaic image and a generation time of the first remosaic image. For example, when it is necessary to generate a first remosaic image within a short time, the remosaic processing circuit 121 may select a machine learning model that generates a first remosaic image by performing a small amount of calculations. In another example, when it is necessary to generate a first remosaic image having high quality, the remosaic processing circuit 121 may select a machine learning model that generates a first remosaic image by performing a large amount of calculations. For example, each of the plurality of machine learning models may be associated with a corresponding processing time. Selection of the machine learning model may be determined based on a comparison of a required processing time and the processing time corresponding to the plurality of machine learning models.

In operation S720, the remosaic processing circuit 121 may perform first remosaic processing based on a selected machine learning model. The remosaic processing circuit 121 may generate a first remosaic image by performing remosaic processing on a first region of the original image by using a selected machine learning model.

Figure 8:
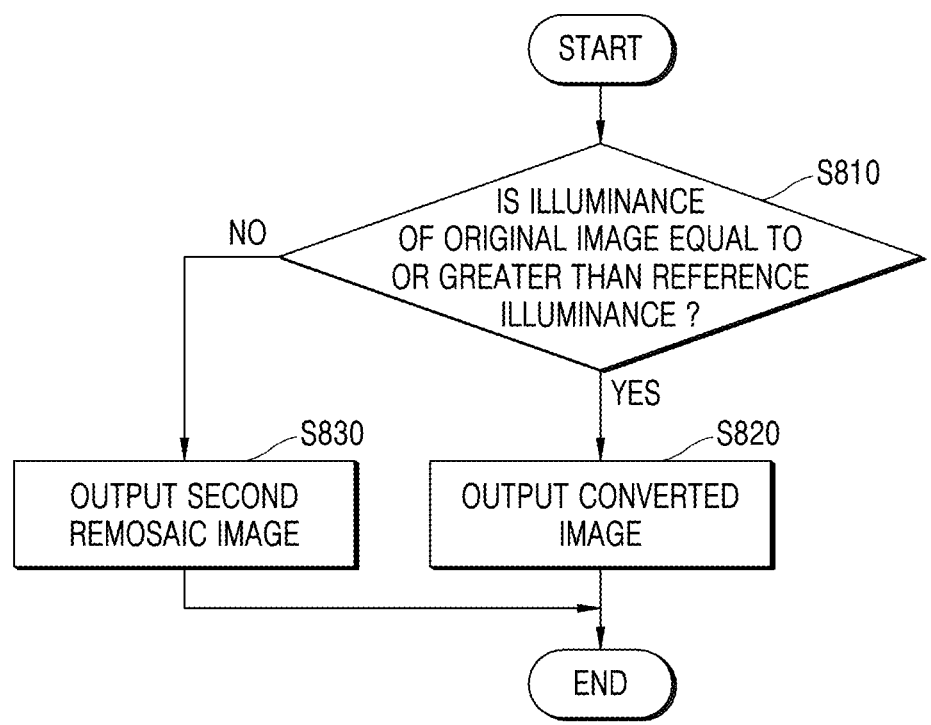
FIG. 8 is a flowchart of an example of a method of selecting an image to be output in an image processing method, according to an embodiment.

FIG. 8 is a flowchart of an example of a method of selecting an image to be output in an image processing method, according to an embodiment.

Referring to FIG. 8, in operation S810, the imaging device 100 may determine whether the illuminance of an original image is equal to or greater than a reference illuminance through the image sensor 110.

When it is determined that the illuminance of the original image is equal to or greater than the reference illuminance, a selection signal may be set, such that the selecting circuit 123 selects a converted image. Therefore, in operation S820, the selecting circuit 123 may select and output a merged image based on the selection signal.

On the contrary, when it is determined that the illuminance of the original image is less than the reference illuminance, the selection signal may be set, such that the selecting circuit 123 selects a second remosaic image. Therefore, in operation S830, the selecting circuit 123 may select and output the second remosaic image based on the selection signal.

Figure 9:
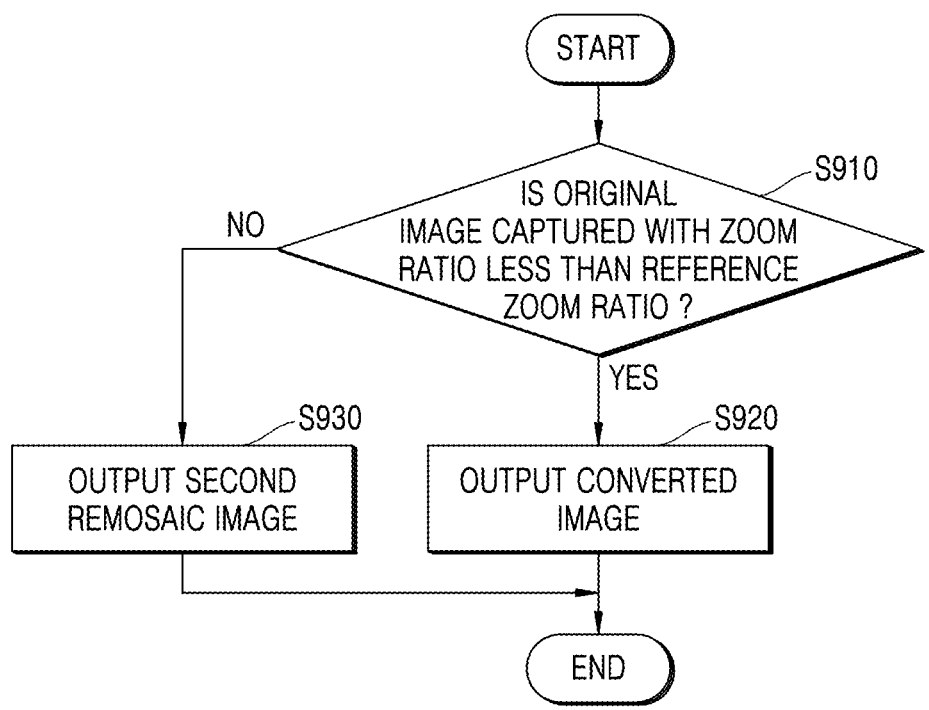
FIG. 9 is a flowchart of another example of a method of selecting an image to be output in an image processing method, according to an embodiment.

FIG. 9 is a flowchart of another example of a method of selecting an image to be output in an image processing method, according to an embodiment.

Referring to FIG. 9, in operation S910, the imaging device 100 may determine whether an original image is an image captured with a zoom ratio lower than a reference zoom ratio, through the image sensor 110.

When it is determined that the original image is an image captured with a zoom ratio less than the reference zoom ratio, the selection signal may be set, such that the selecting circuit 123 selects a converted image. Therefore, in operation S920, the selecting circuit 123 may select and output a merged image based on the selection signal.

On the contrary, when it is determined that the original image is an image captured with a zoom ratio equal to or greater than the pre-set reference zoom ratio, the selection signal may be set, such that the selecting circuit 123 selects a second remosaic image. Therefore, in operation S930, the selecting circuit 123 may select and output the second remosaic image based on the selection signal.

Figure 10:
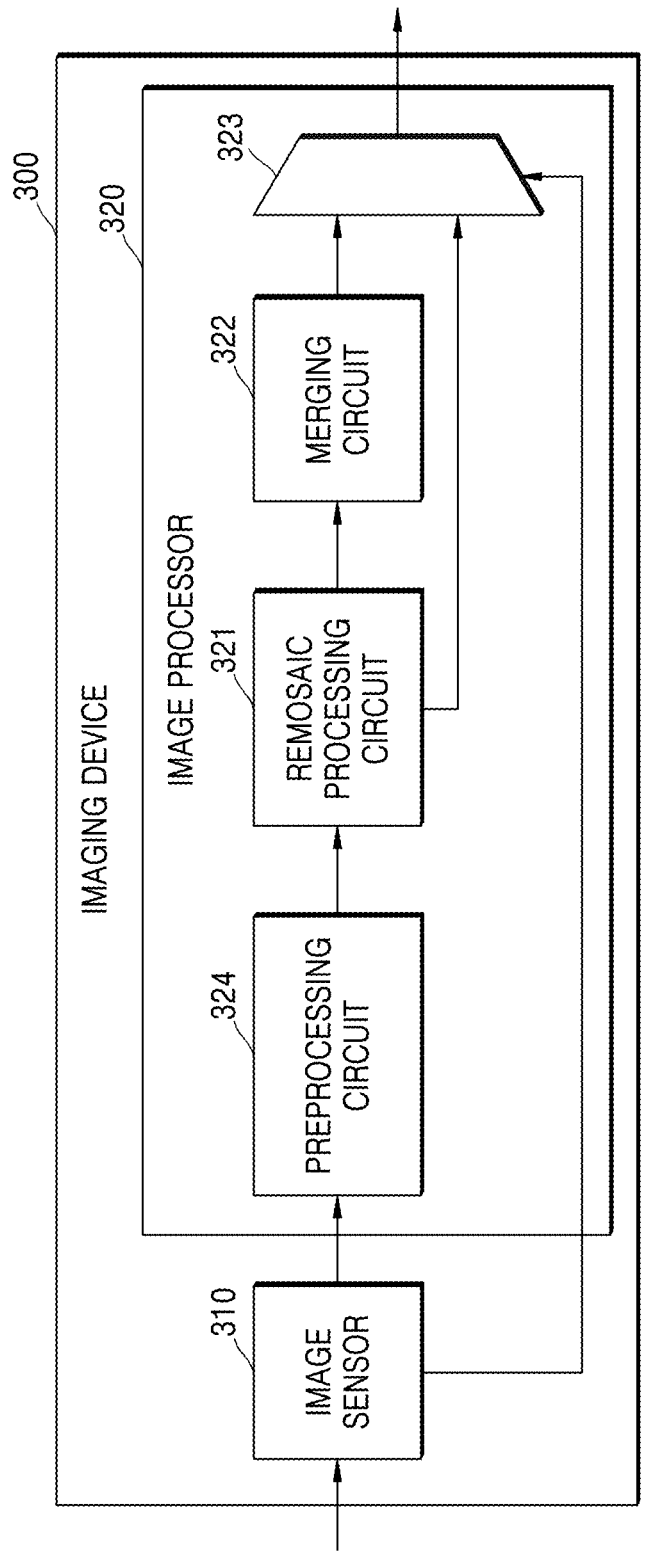
FIG. 10 is a block diagram showing an imaging device according to another embodiment.

FIG. 10 is a block diagram showing an imaging device according to another embodiment.

Referring to FIG. 10, an imaging device 300 according to another embodiment may include an image sensor 310 and an image processor 320. The image sensor 310 of FIG. 10 may be identical to the image sensor 110 of FIG. 1.

The image processor 320 may be a component included in the processor 120 of FIG. 1 and may perform the same operation. The image processor 320 may include a remosaic processing circuit 321, a merging circuit 322, a selecting circuit 323, and a pre-processing circuit 324. The remosaic processing circuit 321, the merging circuit 322, and the selecting circuit 323 of FIG. 10 may respectively perform the same operations as the remosaic processing circuit 121, the merging circuit 122 and the selecting circuit 123 of FIG. 1.

The pre-processing circuit 324 may receive an original image from the image sensor 310 and process the original image to be suitable for remosaic processing of the remosaic processing circuit 321. For example, the pre-processing circuit 324 may perform crosstalk processing on an original image, processing of reshaping an original image to a size suitable for remosaic processing, etc.

Figure 11:
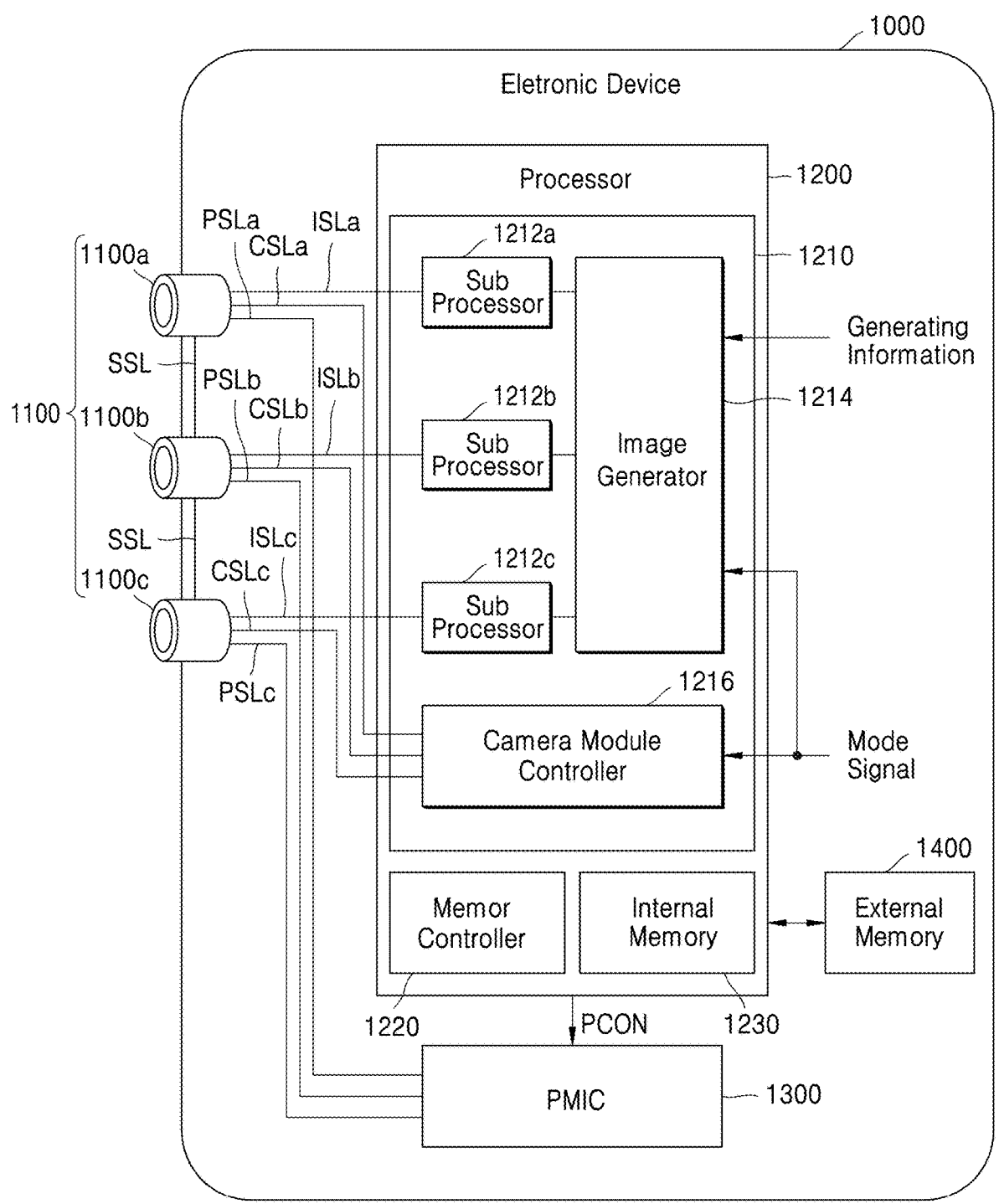
FIG. 11 is a block diagram of an electronic device including a multi-camera module.
Figure 12:
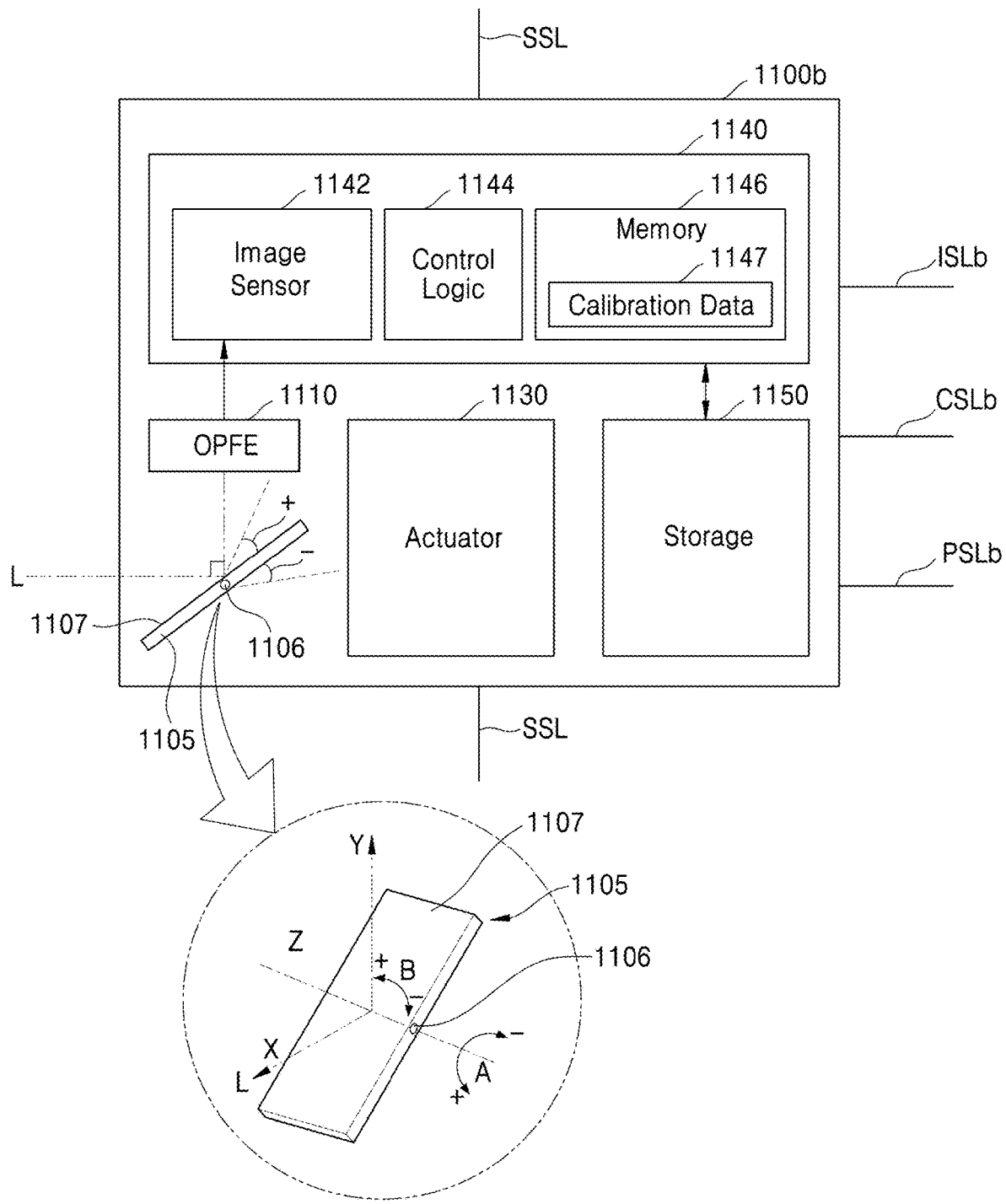
FIG. 12 is a detailed block diagram of a camera module of FIG. 11.

FIG. 11 is a block diagram of an electronic device including a multi-camera module. FIG. 12 is a detailed block diagram of a camera module of FIG. 11.

Referring to FIG. 11, an electronic device 1000 may include a camera module group 1100, a processor 1200, a power management integrated circuit (PMIC) 1300, and an external memory 1400.

The camera module group 1100 may include a plurality of camera modules 1100a, 1100b, and 1100c. Although FIG. 11 shows an embodiment in which three camera modules 1100a, 1100b, and 1100c are arranged, embodiments are not limited thereto. According to some embodiments, the camera module group 1100 may be modified to include only two camera modules. Also, according to some embodiments, the camera module group 1100 may be modified to include n camera modules (n is a natural number equal to or greater than 4).

Hereinafter, the detailed configuration of the camera module 1100b is described in more detail with reference to FIG. 12, but the following description may also be applied to the other camera modules 1100a and 1100c according to embodiments.

Referring to FIG. 12, the camera module 1100b may include a prism 1105, an optical path folding element (OPFE) 1110, an actuator 1130, an image sensing device 1140, and a storage 1150.

The prism 1105 may include a reflective surface 1107 of a light reflecting material to modify the path of light L incident from the outside.

According to some embodiments, the prism 1105 may change the path of light L incident in a first direction X to a second direction Y perpendicular to the first direction X. Also, the prism 1105 may rotate the reflective surface 1107 of the light reflecting material in an A direction or a B direction around a center axis 1106, thereby changing the path of the light L incident in the first direction X to the second direction Y perpendicular to the first direction X. At this time, the OPFE 1110 may also move in a third direction Z perpendicular to the first direction X and the second direction Y.

According to some embodiments, as shown in FIG. 12, the maximum rotatable angle of the prism 1105 in the direction A may be less than or equal to 15 degrees in the positive (+) A direction and may be greater than 15 degrees in the negative (−) A direction. However, embodiments are not limited thereto.

According to some embodiments, the prism 1105 may be rotated by around 20 degrees, between 10 degrees and 20 degrees, or between 15 degrees and 20 degrees in the positive (+) or negative (−) B direction. Here, the prism 1105 may be rotated by the same angle or similar angles that are different from each other by around 1 degree in the positive (+) B direction and the negative (−) B direction.

According to some embodiments, the prism 1105 may move the reflective surface 1107 of the light reflecting material in the third direction (e.g., the Z direction) parallel to the direction in which the center axis 1106 extends.

For example, the OPFE 1110 may include m optical lenses (where m is a natural number) which may be provided in different groups. One or more of the m lenses may move in the second direction Y and change the optical zoom ratio of the camera module 1100b. For example, when the basic optical zoom ratio of the camera module 1100b is Z and one or more of the m optical lenses included in the OPFE 1110 are moved, the optical zoom ratio of the camera module 1100b may be changed to 3Z, 5Z, or an optical zoom ratio higher than 5Z.

The actuator 1130 may move the OPFE 1110 or optical lenses (hereinafter referred to as an optical lens) to a particular position. For example, the actuator 1130 may adjust the position of the optical lens, such that the image sensor 1142 is positioned at the focal length of the optical lens for accurate sensing.

The image sensing device 1140 may include an image sensor 1142, a control logic 1144, and a memory 1146. The image sensor 1142 may sense an image of a sensing target by using the light L provided through the optical lens. The control logic 1144 may control the overall operation of the camera module 1100b. For example, the control logic 1144 may control the operation of the camera module 1100b according to a control signal provided through a control signal line CSLb.

The memory 1146 may store information necessary for the operation of the camera module 1100b, e.g., calibration data 1147. The calibration data 1147 may include information necessary for the camera module 1100b to generate image data by using the light L provided from the outside. The calibration data 1147 may include, for example, information about a degree of rotation described above, information about a focal length, information about an optical axis, etc. When the camera module 1100b is implemented as a multi-state camera in which the focal length is changed depending on the position of the optical lens, the calibration data 1147 may include focal distance values for respective positions (or states) of the optical lens and information related to auto focusing.

The storage 1150 may store image data sensed through the image sensor 1142. The storage 1150 may be provided outside the image sensing device 1140 and may be stacked with a sensor chip constituting the image sensing device 1140. According to some embodiments, the storage 1150 may be implemented with Electrically Erasable Programmable Read-Only Memory (EEPROM), but embodiments are not limited thereto.

Referring to FIGS. 11 and 12 together, according to some embodiments, the camera modules 1100a, 1100b, and 1100c may each include the actuator 1130. Therefore, the camera modules 1100a, 1100b, and 1100c may include the same or different calibration data 1147 according to the operation of actuators 1130 included therein.

According to some embodiments, one camera module (e.g., the camera module 1100b) from among the camera modules 1100a, 1100b, and 1100c may be a folded lens-type camera module including the prism 1105 and the OPFE 1110 as described above, and the other camera modules (e.g., 1100a and 1100c) may be vertical-type camera module without the prism 1105 and the OPFE 1110. However, embodiments are not limited thereto.

According to some embodiments, one camera module (e.g., the camera module 1100c) from among the camera modules 1100a, 1100b, and 1100c may be a vertical-type depth camera that extracts depth information by using an infrared ray (IR), for example. In this case, the processor 1200 may merge image data provided from such a depth camera with image data provided from another camera module (e.g., the camera module 1100a or 1100b) and generate a 3D depth image.

According to some embodiments, at least two camera modules (e.g., the camera module 1100a and the camera module 1100b) from among the camera modules 1100a, 1100b, and 1100c may have different field of views (FOVs). In this case, for example, at least two camera modules (e.g., the camera module 1100a and the camera module 1100b) from among the camera modules 1100a, 1100b, and 1100c may have different optical lenses, but embodiments are not limited thereto.

Furthermore, according to some embodiments, the camera modules 1100a, 110b, and 1100c may have different FOVs from one another. In this case, optical lenses included in the camera modules 1100a, 1100b, and 1100c may also be different from one another, but embodiments are not limited thereto.

According to some embodiments, the camera modules 1100a, 1100b, and 1100c may be physically separated from one another. For example, the camera modules 1100a, 1100b, and 1100c do not divide and use the sensing area of one image sensor 1142. Rather, an independent image sensor 1142 may be provided inside each of the camera modules 1100a, 1100b, and 1100c.

Referring back to FIG. 11, the processor 1200 may include an image processing device 1210, a memory controller 1220, and an internal memory 1230. The processor 1200 may be implemented separately from the camera modules 1100a, 1100b, and 1100c. For example, the processor 1200 and the camera modules 1100a, 1100b, and 1100c may be implemented separately from each other as separate semiconductor chips.

The image processing device 1210 may include a plurality of sub processors 1212a, 1212b, and 1212c, an image generator 1214, and a camera module controller 1216.

The image processing device 1210 may include the number of the sub processors 1212a, 1212b, and 1212c corresponding to the number of the camera modules 1100a, 1100b, and 1100c.

According to an embodiment, the processor 1200 may generate a converted image having a Bayer pattern by performing remosaic processing on an original image. At this time, the processor 1200 may generate a first remosaic image by performing remosaic processing on a first region of an original image by using a first remosaic method, generate a second remosaic image by performing remosaic processing on a second region of the original image by using a second remosaic method, and generate a converted image based on the first remosaic image and the second remosaic image. Therefore, an image generated through the image sensor 1142 may be more efficiently converted into an image having a Bayer pattern.

Image data generated by the camera modules 1100a, 1100b, and 1100c may be respectively provided to sub processors 1212a, 1212b, and 1212c respectively corresponding to the camera modules 1100a, 1100b, and 1100c through image signal lines ISLa, ISLb, and ISLc separated from one another. For example, image data generated by the camera module 1100a may be provided to the sub processor 1212a through the image signal line ISLa, image data generated by the camera module 1100b may be provided to the sub processor 1212b through the image signal line ISLb, and image data generated by the camera module 1100c may be provided to the sub processor 1212c through the image signal line ISLc. The transmission of image data may be performed by using a camera serial interface (CSI) based on the mobile industry processor interface (MIPI), but embodiments are not limited thereto.

According to some embodiments, one sub processor may be provided to correspond to a plurality of camera modules. For example, the first sub processor 1212a and the third sub processor 1212c may be integrally implemented as a single sub processor instead of being implemented separate from each other, and image data provided from the first camera module 1100a and the third camera module 1100c may be selected by a selecting element (e.g., a MUX) and provided to an integrated sub processor.

Image data provided to each of the sub processors 1212a, 1212b, and 1212c may be provided to the image generator 1214. The image generator 1214 may generate an output image by using image data provided from each of the sub processors 1212a, 1212b, and 1212c according to image generating information or a mode signal.

In detail, the image generator 1214 may generate an output image by merging at least parts of image data generated by the camera modules 1100a, 1100b, and 1100c having different FOVs according to image generating information or a mode signal. Also, the image generator 1214 may generate an output image by selecting any one of image data generated by the camera modules 1100a, 1100b, and 1100c having different FOVs according to image generating information or a mode signal.

According to some embodiments, the image generating information may include a zoom signal or a zoom factor. Also, according to some embodiments, the mode signal may be, for example, a signal based on a mode selected by a user.

When the image generating information is a zoom signal (zoom factor) and the camera modules 1100a, 1100b, and 1100c have different FOVs, the image generator 1214 may perform different operations depending on the type of the zoom signal. For example, when the zoom signal is a first signal, after image data output from the camera module 1100a and image data output from the camera module 1100c are merged, an output image may be generated by using a merged image signal and image data output from the camera module 1100b not used for the merging. When the zoom signal is a second signal different from the first signal, the image generator 1214 may not perform such image data merging and may generate an output image by selecting any one of image data output from the camera modules 1100a, 1100b, and 1100c. However, embodiments are not limited thereto, and a method of processing image data may be modified and implemented as needed.

According to some embodiments, the image generator 1214 may receive a plurality of pieces of image data having different exposure times from at least one of the sub processors 1212a, 1212b, and 1212c and perform high dynamic range (HDR) processing with respect to the image data, thereby generating merged image data having an increased dynamic range.

The camera module controller 1216 may provide a control signal to each of the camera modules 1100a, 1100b, and 1100c. A control signal generated from the camera module controller 1216 may be provided to corresponding camera modules 1100a, 1100b, and 1100c through control signal lines CSLa, CSLb, and CSLc separated from one another.

Any one of the camera modules 1100a, 1100b, and 1100c may be designated as a master camera (e.g., 1100b) according to image generation information or a mode signal including a zoom signal, and the remaining camera modules (e.g. 1100a and 1100c) may be designated as slave cameras. This information is included in the control signal and may be provided to the corresponding camera modules 1100a, 1100b, and 1100c through the control signal lines CSLa, CSLb, and CSLc separated from one another.

Camera modules operating as a master and slaves may be changed according to a zoom factor or an operation mode signal. For example, when the FOV of the camera module 1100a is wider than the FOV of the camera module 1100b and the zoom factor of the camera module 1100a indicates a lower zoom ratio, the camera module 1100b may operate as the master, and the camera module 1100a may operate as a slave. Conversely, when the zoom factor of the first camera module 1100a indicates a higher zoom ratio, the camera module 1100a may operate as the master, and the camera module 1100b may operate as a slave.

According to some embodiments, the control signal provided to the camera modules 1100a, 1100b, and 1100c from the camera module controller 1216 may include a sync enable signal. For example, when the camera module 1100b is the master camera, and the camera module 1100a and the camera module 1100c are the slave cameras, the camera module controller 1216 may transmit the sync enable signal to the camera module 1100b. The camera module 1100b to which the sync enable signal is provided generates a sync signal based on the provided sync enable signal and provides the generated sync signal to the camera module 1100a and the camera module 1100c through a sync signal line SSL. The camera module 1100b and the camera modules 1100a and 1100c may be synchronized with the sync signal and transmit image data to the processor 1200.

According to some embodiments, the control signal provided to the camera modules 1100a, 1100b, and 1100c from the camera module controller 1216 may include mode information according to a mode signal. Based on the mode information, the camera modules 1100a, 1100b, and 1100c may operate in a first operation mode and a second operation mode in relation to sensing speeds.

In a first operation mode, the camera modules 1100a, 1100b, and 1100c may each generate an image signal at a first speed (e.g., generate an image signal having a first frame rate), encode the image signal at a second speed faster than the first speed (e.g., encode to an image signal having a second frame rate higher than the first frame rate), and transmit an encoded image signal to the processor 1200. Here, the second speed may be up to 30 times of the first speed.

The processor 1200 may store a received image signal, that is, the encoded image signal, in the internal memory 1230 provided therein or the external memory 1400 outside the processor 1200, and, thereafter, the processor 1200 may read the encoded image signal from the internal memory 1230 or the external memory 1400, decode the encoded image signal, and display image data generated based on the decoded image signal. For example, a corresponding sub processor from among the sub processors 1212a, 1212b, and 1212c of the image processing device 1210 may perform decoding and may also perform image processing on a decoded image signal.

In a second operation mode, the camera modules 1100a, 1100b, and 1100c may each generate an image signal at a third speed slower than the first speed (e.g., generate an image signal having a third frame rate lower than the first frame rate) and transmit the image signal to the processor 1200. The image signal provided to the processor 1200 may be an unencoded signal. The processor 1200 may perform image processing on a received image signal or store the received image signal in the internal memory 1230 or the external memory 1400.

The PMIC 1300 may supply power, e.g., a power voltage, to each of the camera modules 1100a, 1100b, and 1100c. For example, under the control of the processor 1200, the PMIC 1300 may supply first power to the camera module 1100a through a power signal line PSLa, supply second power to the camera module 1100b through a power signal line PSLb, and supply third power to the camera module 1100c through a power signal line PSLc.

The PMIC 1300 may generate power corresponding to each of the camera modules 1100a, 1100b, and 1100c in response to a power control signal PCON from the processor 1200 and may also adjust power levels. The power control signal PCON may include a power adjustment signal for each operation mode of the camera modules 1100a, 1100b, and 1100c. For example, an operation mode may include a low-power mode, and, in this case, the power control signal PCON may include information regarding a camera module operating in the low-power mode and a power level set for the low-power mode. Levels of powers provided to the camera modules 1100a, 1100b, and 1100c may be the same or different from one another. Also, the level of power may be changed dynamically.

In some example embodiments, each of the components, elements, modules or units represented by a block as illustrated in FIGS. 1, 3, and 10-12 may be implemented as various numbers of hardware, software and/or firmware structures that execute respective functions described above, according to example embodiments. For example, at least one of these components, elements, modules or units may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components, elements, modules or units may include a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Functional aspects of example embodiments may be implemented in algorithms that execute on one or more processors. Furthermore, the components, elements, modules or units represented by a block or processing steps may employ any number of related art techniques for electronics configuration, signal processing and/or control, data processing and the like.

While aspects of embodiments have been particularly shown and described, it will be understood that various changes in form and details may be made therein without departing from the spirit and scope of the following claims.

What is claimed is:

1. An imaging device comprising:
   an image sensor configured to generate an original image; and
   a processor comprising:
      a remosaic processing circuit configured to generate a first remosaic image by performing remosaic processing on a first region of the original image by using a first remosaic method, and generate a second remosaic image by performing remosaic processing on a second region of the original image by using a second remosaic method; and
      a merging circuit configured to generate a converted image having a Bayer pattern based on the first remosaic image and the second remosaic image,
   wherein the second region comprises the first region.

2. The imaging device of claim 1, wherein the first remosaic method comprises a method of performing the remosaic processing by using a machine learning model, and
   wherein the second remosaic method comprises a method of performing the remosaic processing based on a pre-set reference equation.

3. The imaging device of claim 2, wherein the machine learning model comprises a neural network model.

4. The imaging device of claim 2, wherein the remosaic processing circuit is further configured to:
   select one or more machine learning models from among a plurality of machine learning models, based on quality of the first remosaic image and a generation time of the first remosaic image; and
   perform the remosaic processing on the first region to generate the first remosaic image using the one or more machine learning models.

5. The imaging device of claim 1, wherein the first region is a pre-set central region of the original image, and
   wherein the second region is an entire region of the original image.

6. The imaging device of claim 1, wherein the remosaic processing circuit is further configured to detect a seam in the original image and determine the first region based on the seam.

7. The imaging device of claim 1, wherein the merging circuit is further configured to generate the converted image by merging the first remosaic image to a corresponding region of the second remosaic image.

8. The imaging device of claim 7, wherein the merging circuit is further configured to generate the converted image by performing correction processing on boundary regions of the first remosaic image and the second remosaic image after merging the first remosaic image and the second remosaic image.

9. The imaging device of claim 1, wherein the processor further comprises a selecting circuit configured to output one of the second remosaic image and the converted image based on a selection signal generated by the image sensor.

10. The imaging device of claim 9, wherein according to the selection signal, the selecting circuit is configured to output the converted image based on illuminance of the original image being equal to or greater than a pre-set reference illuminance, and output the second remosaic image based on the illuminance of the original image being less than the pre-set reference illuminance.

11. The imaging device of claim 9, wherein according to the selection signal, the selecting circuit is configured to output the converted image based on the original image being an image captured with a zoom ratio less than a pre-set reference zoom ratio, and output the second remosaic image based on the original image being an image captured with a zoom ratio equal to or greater than the pre-set reference zoom ratio.

12. An image processing method comprising:
    generating an original image through an image sensor;
    generating, through a processor, a first remosaic image by performing remosaic processing on a first region of the original image by using a first remosaic method;
    generating, through the processor, a second remosaic image by performing remosaic processing on a second region of the original image by using a second remosaic method; and
    generating a converted image having a Bayer pattern based on the first remosaic image and the second remosaic image,
    wherein the second region comprises the first region.

13. The image processing method of claim 12, wherein the first remosaic method comprises a method of performing the remosaic processing by using a machine learning model, and
    wherein the second remosaic method comprises a method of performing the remosaic processing based on a pre-set reference equation.

14. The image processing method of claim 12, wherein the generating of the first remosaic image comprises:
    selecting one or more machine learning models from among a plurality of machine learning models, based on quality of the first remosaic image and a generation time of the first remosaic image; and
    generating the first remosaic image by performing the remosaic processing on the first region of the original image by using the one or more machine learning models.

15. The image processing method of claim 12, further comprising outputting, through the processor, one of the second remosaic image and the converted image.

16. The image processing method of claim 15, wherein the outputting comprises:
    outputting the converted image based on illuminance of the original image being equal to or greater than a pre-set reference illuminance; and
    outputting the second remosaic image based on the illuminance of the original image being less than the pre-set reference illuminance.

17. The image processing method of claim 15,
    wherein the outputting comprises:
    outputting the converted image when a zoom ratio of the original image being less than a pre-set reference zoom ratio; and
    outputting the second remosaic image based on the zoom ratio being equal to or greater than the pre-set reference zoom ratio.

18. An imaging device comprising:
    an image sensor configured to generate an original image; and
    an image processor configured to perform remosaic processing by using a first remosaic method on a first region of the original image and a second remosaic method on a second region of the original image to generate a converted image having a Bayer pattern,
    wherein the second region comprises the first region.

19. The imaging device of claim 18, wherein the image processor is further configured to:
  generate a first remosaic image by performing remosaic processing on the first region of the original image by using the first remosaic method;
  generate a second remosaic image by performing remosaic processing on the second region of the original image by using the second remosaic method; and
  generate the converted image based on the first remosaic image and the second remosaic image.

20. The imaging device of claim 18, wherein the first remosaic method comprises a method of performing the remosaic processing by using a machine learning model, and
  wherein the second remosaic method comprises a method of performing the remosaic processing based on a pre-set reference equation.

* * * * *